（12）United States Patent
Jain et al.

(10) Patent No.: US 10,482,171 B2
(45) Date of Patent: Nov. 19, 2019

(54) DIGITAL FORM OPTIMIZATION

(71) Applicant: Adobe Inc., San Jose, CA (US)

(72) Inventors: Arneh Jain, Kozhilkode (IN); Salil Taneja, Noida (IN)

(73) Assignee: Adobe Inc., San Jose, CA (US)

( * ) Notice: Subject to any disclaimer, the term of this patent is extended or adjusted under 35 U.S.C. 154(b) by 34 days.

(21) Appl. No.: 15/806,494

(22) Filed: Nov. 8, 2017

(65) Prior Publication Data

US 2019/0138585 A1    May 9, 2019

(51) Int. Cl.
*G06F 17/24* (2006.01)
*G06F 17/22* (2006.01)

(52) U.S. Cl.
CPC ........ *G06F 17/243* (2013.01); *G06F 17/2235* (2013.01)

(58) Field of Classification Search
CPC .................. G06F 17/243; G06F 17/2235
See application file for complete search history.

(56) References Cited

U.S. PATENT DOCUMENTS

| | | | | |
|---|---|---|---|---|
| 8,856,676 | B1 * | 10/2014 | Starenky | G06F 17/243 715/780 |
| 2004/0117654 | A1 * | 6/2004 | Feldman | G06F 21/6218 726/22 |
| 2006/0200754 | A1 * | 9/2006 | Kablesh | G06F 17/243 715/226 |
| 2007/0260612 | A1 | 11/2007 | Papakonstantinou et al. | |
| 2008/0052305 | A1 | 2/2008 | Ohno | |
| 2008/0120310 | A1 * | 5/2008 | Khoury | G06F 16/487 |
| 2009/0013259 | A1 * | 1/2009 | Teichman | G06N 5/04 715/738 |
| 2014/0207777 | A1 * | 7/2014 | Palmert | G06F 16/90335 707/737 |
| 2014/0245119 | A1 * | 8/2014 | Barrus | G06F 17/243 715/224 |
| 2015/0271092 | A1 * | 9/2015 | Ward, Jr. | H04L 67/10 709/226 |
| 2017/0262421 | A1 * | 9/2017 | Yue | H04L 63/00 |
| 2018/0018352 | A1 * | 1/2018 | Zhou | G06Q 50/22 |

\* cited by examiner

*Primary Examiner* — Scott T Baderman
*Assistant Examiner* — Seung Woon Jung
(74) *Attorney, Agent, or Firm* — Finch & Maloney PLLC

(57) ABSTRACT

Digital form optimization techniques are disclosed which reduce the number of segments in empty digital forms that consumers of the empty digital forms need to complete. In some examples, a method may include determining potentially linkable segments in an empty digital form, determining a type of link to create for a potentially linkable segment of the potentially linkable segments, and providing a recommendation to create the determined type of link for the potentially linkable segment. The method may also include creating the determined type of link for the potentially linkable segment in response to a determination of an acceptance of the recommendation.

17 Claims, 6 Drawing Sheets

DIGITAL FORM OPTIMIZATION

FIELD OF THE DISCLOSURE

This disclosure relates generally to digital forms, and more particularly, to techniques to optimize digital forms by linking redundant segments in digital forms to reduce the number of segments that need completing.

BACKGROUND

Many organizations still employ paper forms for their data capture and management needs. These paper forms may include a large number of redundant fields in different sections of the forms. This may have been the result of different sections of completed paper forms being consumed by different consumers, in which case the redundancies in the paper forms may have been justified from the perspective of the form consumer. For example, a page or pages of a paper form containing the different sections may have been physically separated for consumption by different consumers. The presence of redundant fields in the paper forms increases the burden on users to enter the same data repeatedly on the paper forms, leading to user dissatisfaction.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

Figure 1:
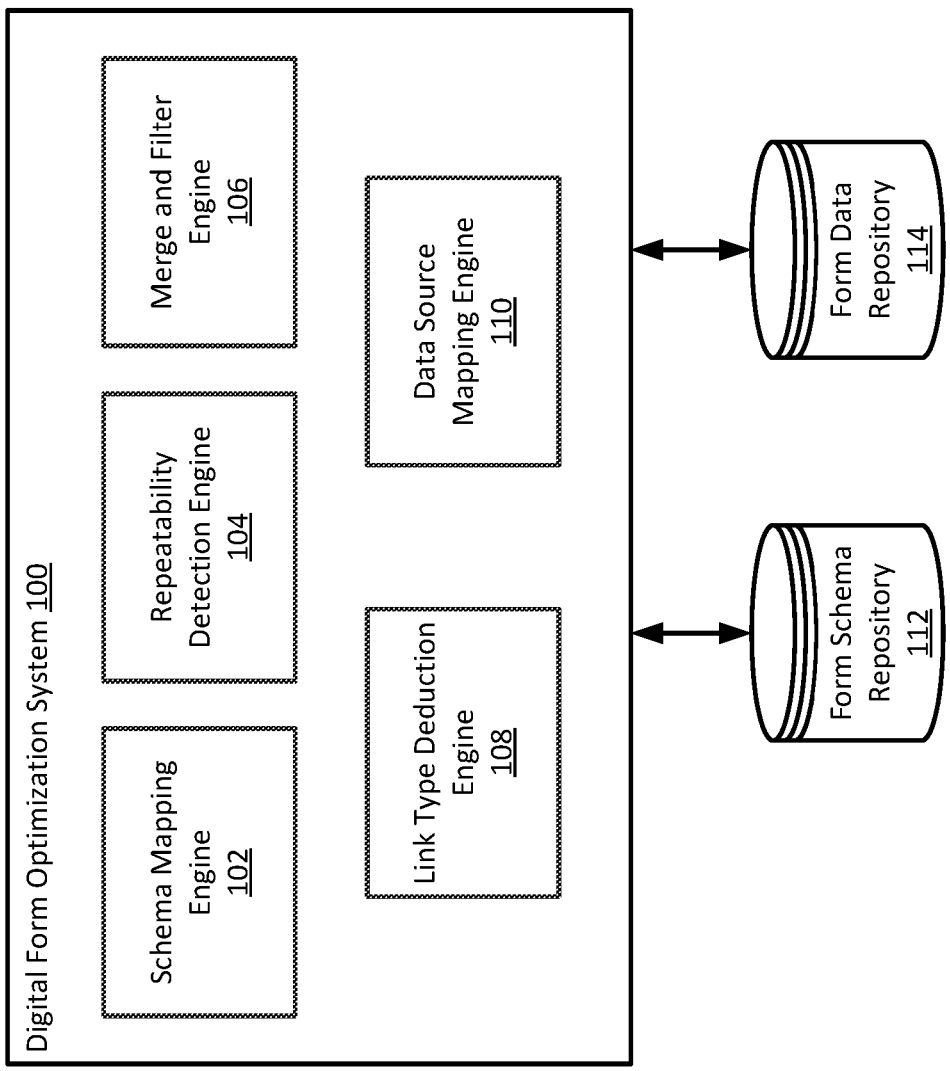
FIG. 1 illustrates selected components of an example digital form optimization system, arranged in accordance with at least some embodiments described herein.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

With the onset of the digital age, organizations that have traditionally relied on paper forms for enrolling in or obtaining their services and offerings are under increasing pressures to create digital experiences for their customers. And, converting to the use of digital forms can be considered key to creating the digital experiences for their customers. Numerous solutions provide for conversion of existing paper forms to digital forms. As noted above, existing paper forms may include a large number of redundant fields in different sections of the forms. Unfortunately, the digitally converted paper forms (digital forms generated by digitally converting paper forms) will have the same redundant fields that are present in the paper forms. As a result, digital forms generated using existing solutions that convert paper forms to digital forms continue to provide users a sub-optimal form filling experience. Moreover, the justification noted above for the presence of redundant fields in paper forms generally does not apply to digital forms in that the data (information) contained in completed digital forms can be consumed by different consumers even without the use of redundant fields.

To this end, techniques are disclosed for optimizing empty digital forms by identifying and linking redundant segments in an empty digital form. Linking redundant segments of an empty digital form reduces the number of segments that need completion (need to be filled) by a consumer of the empty digital form. For example, once a consumer completes a segment in an empty digital from by providing the data requested by the segment, other segments in the digital form that are linked to the completed segment (the other segments in the digital form that are redundant to the segment completed by the consumer) may automatically be completed with the data from the completed segment.

In some embodiments, a schema mapping engine is configured to identify segments in an empty digital form based on a corpus of existing form schema types. The various segments of the empty digital form are compared to the existing form schema types to identify schema mapped segments in the empty digital form. A schema mapped segment is a segment that maps to (matches) a form schema type. For example, suppose the existing form schema types include a schema type element that includes a field for providing a name and another field for providing a telephone number. Also suppose that an empty digital form includes a segment labeled "contact information", which includes a field for providing a name (e.g., labeled "Enter Name") and another field for providing a telephone number (e.g., labeled "Enter Phone Number"), on page 1 of the empty digital form, and another segment with the same label "contact information", which includes a field for providing a name (e.g., labeled "Please Enter Your Name") and another field for providing a telephone number (e.g., labeled "Enter Phone #"), on page 3 of the empty digital form. In this instance, the two segments labeled "contact information" will both map to the same schema type element that includes a name field and a telephone number field. Accordingly, the segment labeled "contact information" on page 1 and the segment labeled "contact information" on page 3 are identified as being schema mapped segments. In some embodiments, the segment labeled "contact information" on page 1 and the segment labeled "contact information" on page 3 may also be identified being possibly repeating segments in the empty digital form (segment "contact information" on page 3 is possibly a repeat of segment "contact information" on page 1) as a result of the segments mapping to the same form schema type. As another example, suppose the empty digital form above also includes a segment labeled "residence address", which includes respective fields for providing a street address, a city, a state, and a zip code, one page 1 of the empty digital form, and another segment labeled "permanent address", which includes respective fields for providing a street address, a city, a state, and a zip code, one page 2 of the empty digital form. In this instance, if the existing form schema types include a schema type element that includes respective fields for a street address, a city, a state, and a zip code, the two segments labeled "residence address" and "permanent address", regardless of the label of the respective fields, will both map to this schema type element. Accordingly, the segment labeled "residence address" on page 1 and the segment labeled "permanent address" on page 2 are identified as being schema mapped segments. In some embodiments, the segment labeled "residence address" on page 1 and the segment labeled "permanent address" on page 2 may also be identified as being possibly repeating segments in the empty digital form (segment "permanent address" on page 2 is possibly a repeat of segment "residence address" on page 1).

In some embodiments, a repeatability detection engine is configured to parse an empty digital form and identify groups of segments in the empty digital form that repeat (that are repeated) within the empty digital form. Additionally or alternatively, the repeatability detection engine may identify maximal repeating segments from the identified groups of repeating segments in the empty digital form. A maximal repeating segment includes the largest number of fields that is repeating. For example, suppose an empty digital form includes a sequence of fields A, B, C, and D on page 1 of the empty digital form, and another sequence of fields A, B, C, and D on page 2 of the empty digital form. In this instance, the sequence of fields A, B, C, and D is a repeating segment. Moreover, any subset sequence of two or more fields of the sequence of fields A, B, C, and D can also be a repeating segment. That is, the sequence of fields A and B can be a repeating segment within the empty digital form, the sequence of fields B and C can be a repeating segment within the empty digital form, the sequence of fields C and D can be a repeating segment within the empty digital form, the sequence of fields A, B, and C can be a repeating segment within the empty digital form, the sequence of fields B, C, and D can be a repeating segment within the empty digital form, and the sequence of fields A, B, C, and D can be a repeating segment within the empty digital form. In this example, the maximal repeating segment is the segment that includes the sequence of fields A, B, C, and D, in that the sequence of the four fields A, B, C, and D is the maximum number of fields that is repeating in any of the repeating segments generated from the sequence of the four fields A, B, C, and D. The segment that includes the fields A, B, and C, while being a repeating segment, is not a maximal repeating segment since the repeating segment that includes the fields A, B, C, and D includes a larger number of fields. As another example, suppose the empty digital form above also includes a sequence of fields X, Y, and Z on page 1 of the empty digital form, and another sequence of fields X, Y, Z on page 4 of the empty digital form. The segment that includes the sequence of fields X, Y, and Z is also a maximal repeating segment. That is, in the example above, there are two maximal repeating segments, one maximal repeating segment that includes the sequence of fields A, B, C, and D, and another maximal repeating segment that includes the sequence of fields X, Y, and Z. In a more general sense, an empty digital form can include one or more repeating segments.

In some embodiments, a merge and filter engine may be configured to merge the results of the schema mapping engine (e.g., the schema mapped segments) and the results of the repeatability detection engine (e.g., the identified maximal repeating segments). The merge and filter engine may be further configured to filter the result of the merging to remove duplicates, and generate a collection of one or more groups of potentially linkable segments in the empty digital form. A group of potentially linkable segments includes at least one segment. Potentially linkable segments are segments that either are repeated in the empty digital form or are schema mapped segments.

For example, the schema mapping engine may have identified a segment L as a schema mapped segment (e.g., segment L maps to a form schema type A) in an empty digital form, a segment M as another schema mapped segment (e.g., segment M maps to a form schema type B) in the empty digital form, and a segment N as still another schema mapped segment (e.g., segment N maps to the form schema type A) in the empty digital form. Moreover, the repeatability detection engine may have also identified the segment M as a maximal repeating segment in the empty digital form, also identified the segment N as another maximal repeating segment in the empty digital form, and identified a segment O as still another maximal repeating segment (e.g., multiple instances of segment O) in the empty digital form. In this instance, the schema mapped segments identified by the schema mapping engine and the repeating segments identified by the repeatability detection engine are merged and filtered to identify schema mapped segment L and repeating segments M, N, and O as the potentially linkable segments in the empty digital form. For example, the schema mapped segment L is identified as one group of potentially linkable segments, the repeating segments M are identified as another group of potentially linkable segments, the repeating segments N are identified as still another group of potentially linkable segments, and the repeating segments O are identified as yet another group of potentially linkable segments. The segments in a group of potentially linkable segments may be represented using a multimap, for example, an ordered set of segments having a predecessor (parent) successor (child) relationship, except for the first segment in the set which will not have a predecessor (parent), and the last segment in the set which will not have a successor (child).

In some embodiments, the merge and filter engine analyzes each potentially linkable segment that is a maximal segment (potentially linkable maximal segment) for the presence (inclusion) of a schema mapped segment or schema mapped segments. A schema mapped segment which is included in a potentially linkable maximal segment, is also a potentially linkable segment. For each potentially linkable maximal segment that includes a schema mapped segment, the merge and filter engine separates (breaks out) the schema mapped segment from the potentially linkable maximal segment to generate multiple potentially linkable segments, one of which is the schema mapped segment. For example, suppose a potentially linkable maximal segment includes the sequence of fields A, B, C, D, E, F, and G. Also suppose that the sequence of fields D and E is identified as a schema mapped segment. In this instance, the schema mapped segment (fields D and E) is separated from the potentially linkable maximal segment to generate three groups of potentially linkable segments; a first group of potentially linkable segments that includes the segments that include the sequence of fields A, B, and C, a second group of potentially linkable segments that includes the segments that include the sequence of fields D and E (the schema mapped segments), and a third group of potentially linkable segments that includes the segments that include the sequence of fields F and G. For a potentially linkable maximal segment that includes more than one schema mapped segment, the merge and filter engine can separate out each of the schema mapped segments from the potentially linkable maximal segment.

The groups of potentially linkable segments in the digital form are processed to determine a type of link, if any, to create for or between the potentially linkable segments in each group of potentially linkable segments. For example, suppose one group of potentially linkable segments includes a segment on page 1, a segment on page 2, and a segment on page 4 of an empty digital form. The three segments (the segment on page 1, the segment on page 2, and the segment on page 4) are processed to determine the type of link, if any, to create for or between the segments on pages 1, 2, and 4 of the empty digital form. In some embodiments, the determination of the type of link to create is based on a corpus of existing completed forms of the same type. For example, an empty digital financial loan form may be optimized by identifying and linking repeating segments in the empty digital financial loan form as described herein. The type of link, if any, to create for or between linkable segments in the empty digital financial loan form can be based on a corpus of existing completed (filled) financial loan forms that are the same as the empty digital financial loan form. In the above example, suppose the empty digital financial loan form includes two linkable segments, one segment on page 1 and another segment on page 2. The determination as to the type of link, if any, to create between the segment on page 1 and the segment on page 2 can be based on an analysis of the contents of the two segments (the segment on page 1 and the segment on page 2) in the corpus of existing completed forms of the same type. In some embodiments, the type of link, if any, to create between two potentially linkable segments is based on a similarity metric of the contents of the two potentially the linkable segments in the corpus of existing completed forms of the same type. That is, the type of link, if any, to create between two potentially linkable segments, a child segment and a parent segment, is based on a similarity metric determined from a comparison of the contents of the child segment and the contents of the parent segment in the corpus of existing completed forms of a same type as the empty digital form.

In some embodiments, a prefill link may be created for a segment of the potentially linkable segments based on a variability metric. The variability metric is a measure of the variability (e.g., degree of change) of the contents of the segment across the corpus of existing completed forms of the same type as the empty digital form. In this instance, the segment is not linked to any of the other segments of the potentially linkable segments, or any other segment in the empty digital form, but, instead, potentially prefilled with default data based on the contents of the segment in the corpus of existing completed forms of the same type. A segment that is prefilled with default data can also be considered a redundant segment in that the segment need not be completed by a consumer.

In some embodiments, the potentially linkable segments in an empty digital form may be linked to a data source. For example, a form author or other entity that is optimizing an empty digital form may have specified a data source from which to obtain the data to provide in the potentially linkable segment (the data to fill in the potentially linkable segment). In this instance, the potentially linkable segment is linked to the specified data source. As an example, the potentially linkable segments may be segments for providing employee data such as employment start date and current department and division, and the form author may have specified a data source from which the appropriate data can be automatically retrieved from to complete the segment. As another example, the potentially linkable segments may be segments for providing address information, and the form author may have specified a data source from which the appropriate information can be automatically retrieved from to complete the segment or portions of the segment (e.g., parts of the address may be filled or completed with information obtained by the area code). A segment that is linked to a data source can also be considered a redundant segment in that the segment need not be completed by a consumer.

In some embodiments, the determined link to create for a redundant segment in an empty digital form may be recommended or otherwise suggested to a form author for creation in the empty digital form. For example, the author may be given the ability to accept or reject the recommended creation of links for redundant segments in an empty digital form. If the form author accepts a recommended link for a redundant segment, the recommended link is automatically created for the redundant segment. Conversely, if the form author rejects a recommended link for a redundant segment, the recommended link is not created for the redundant segment. The form author may be given the ability to create links, including different types of links, for various segments, including redundant segments, in an empty digital form. In still other embodiments, the determined links for the redundant segments in an empty digital form are automatically created in the empty digital form being optimized, so as to liberate the form author from the decision process. Note that, in some such embodiments, auto-creation of links for the redundant segments in an empty digital form is a user-configurable setting, as some form authors may not care for such auto-creation.

As used herein, the term "digital form" refers, in addition to its ordinary meaning, to a document that allows data to be entered into the form using a computer. A digital form can be understood as including one or more fields that, when interacted with by a consumer, results in the collection of data provided by the consumer.

As used herein, the term "segment" or "form segment" refers, in addition to its ordinary meaning, to a collection of one or more fields in a digital form.

As used herein, the term "form schema type element" or "schema type element" or "schema type" refers, in addition to its ordinary meaning, to a type of form element that contains one or more elements. A schema type element is an element that is a collection of simple type elements and/or other complex type elements. A simple type element is just the element in and of itself. For example, in the context of forms, a single field is a simple type element, and a collection of fields is a complex type element.

As used herein, the term "form author" or "author" refers, in addition to its ordinary meaning, to a user, an entity, or a software application instance that generates, designs, manipulates, analyzes, revises, or optimizes an empty digital form, or that otherwise represents the source of the empty digital form in a workflow.

As used herein, the term "form consumer" or "consumer" refers, in addition to its ordinary meaning, to a user, an entity, or a software application instance that receives, provides data to, or interacts with an empty digital form, or that represents the target of an empty digital form in a workflow.

As used herein, the term "hard link" refers, in addition to its ordinary meaning, to a link from a child segment to a parent segment, where the child segment is not fillable by the consumer. The child segment is filled in with the data from the parent segment. By default, in some embodiments, a child segment having a hard link in an empty digital form will not be visible to a consumer of the empty digital form. In some embodiments, the appearance of the child segment having a hard link in an empty digital form is a configurable setting, and a form author can configure the appearance of a child segment having a hard link in an empty digital form. For example, the form author may configure a child segment having a hard link to appear as a summary segment that is viewable by the consumer in an empty digital form, to appear as a non-fillable segment in an empty digital form, to be greyed-out in an empty digital form, or to be hidden (not appear) in an empty digital form, to name a few examples.

As used herein, the term "soft link" refers, in addition to its ordinary meaning, to a one way link from a parent segment to a child segment. Initially, the child segment is filled in with the data from the parent segment. However, if the consumer changes the data in the child segment, the soft link is broken and the child segment will function (operate) independently from the previously soft linked parent segment. In some embodiments, the appearance of the child segment having a soft link in an empty digital form is a configurable setting, and a form author can configure the appearance of a child segment having a soft link in an empty digital form.

As used herein, the term "data source link" refers, in addition to its ordinary meaning, to a link from a pre-configured data source to a segment. A form author may specify a data source link for a segment. In some embodiments where a data source link is applied to a segment in an empty digital form, a consumer may be given the ability to activate the applied data source link between the segment and the pre-configured data source. For example, a control element, such as a button or other suitable activation mechanism, to activate the applied data source link may be provided in the vicinity of the segment in the digital form. If a consumer activates the applied data source link, the segment is filled in with the data from the pre-configured data source.

As used herein, the term "prefill link" refers, in addition to its ordinary meaning, to providing default data to a segment. A segment having a prefill link is prefilled with default data and is not linked to another segment or a data source. In some embodiments where a prefill link is applied to a segment in an empty digital form, a consumer may be given the ability to de-activate the applied prefill link, which results in the segment to be not prefilled with default data. In this instance, the segment is fillable by the consumer. For example, a control element, such as a button or other suitable de-activation mechanism, to de-activate the applied prefill link may be provided in the vicinity of the segment in the digital form.

As used herein, the term "redundant segment" refers, in addition to its ordinary meaning, to a segment or segments in an empty digital form that are not necessary to the meaning or function of the empty digital form. For example, a redundant segment in an empty digital form may be a segment that repeats in the empty digital form, and is not necessary to the meaning or function of the empty digital form given the existence or presence of a segment which the redundant segment is a repeat of. Stated another way, given a first segment in a group of repeating segments, the other segments in the group of repeating segments are redundant segments (redundant to the first segment) given the existence of the first segment in the group of repeating segments. For example, in a group of repeating segments A, B, and C, the repeating segments B and C may be considered the redundant segments. That is, segments B and C may each be considered redundant given segment A. As another example, in a linked list of repeating segments that includes a parent repeating segment and a child repeating segment, the child repeating segment is a redundant segment given the parent repeating segment. Additionally or alternatively, a segment in an empty digital form that can be automatically completed with default data (e.g., in the instance of a prefill link) or with data from a data source (e.g., in the instance of a data source link) is a redundant segment in that the segment is not necessary to the meaning or function of the empty digital form.

System Architecture

Turning now to the figures, FIG. 1 illustrates selected components of an example digital form optimization system 100, arranged in accordance with at least some embodiments described herein. Digital form optimization system 100 may facilitate optimization of empty digital forms by reducing the number of segments that consumers of the empty digital forms need to fill or complete. In some embodiments, digital form optimization system 100 optimizes an empty digital form by automatically determining a type of link to create for each redundant segment in the empty digital form, and recommending to a form author the creation of the determined type of link for the redundant segments. Based on the responses from the form author, digital form optimization system 100 creates links for the redundant segments, thus reducing the number of segments that need completing by consumers of the optimized empty digital form.

As depicted, digital form optimization system 100 includes a schema mapping engine 102, a repeatability detection engine 104, a merge and filter engine 106, a link type deduction engine 108, and a data source mapping engine 110. In various embodiments, additional components (not illustrated, such as processors, display, user input devices, etc.) or a subset of the illustrated components can be employed without deviating from the scope of the present disclosure. For instance, other embodiments may integrate the various functionalities of engines 102, 104, 106, 108, and 110 into fewer engines (e.g., one or two) or more engines (e.g., six or ten, or more). In addition, further note that the various components of system 100 may all be in a stand-alone computing system according to some embodiments, while in others may be distributed across multiple machines. For example, each of engines 102, 104, 106, 108, and 110 can be located in a cloud-based server arrangement, and made accessible to a client-based user interface via a communications network. In some cases, one or more of engines 102, 104, 106, 108, and 110 may be downloaded from a cloud-based service into a browser (or other application) of a client computer for local execution. In a more general sense, the degree of integration and distribution of the functional component(s) provided herein can vary greatly from one embodiment to the next, as will be appreciated in light of this disclosure.

Figure 2:
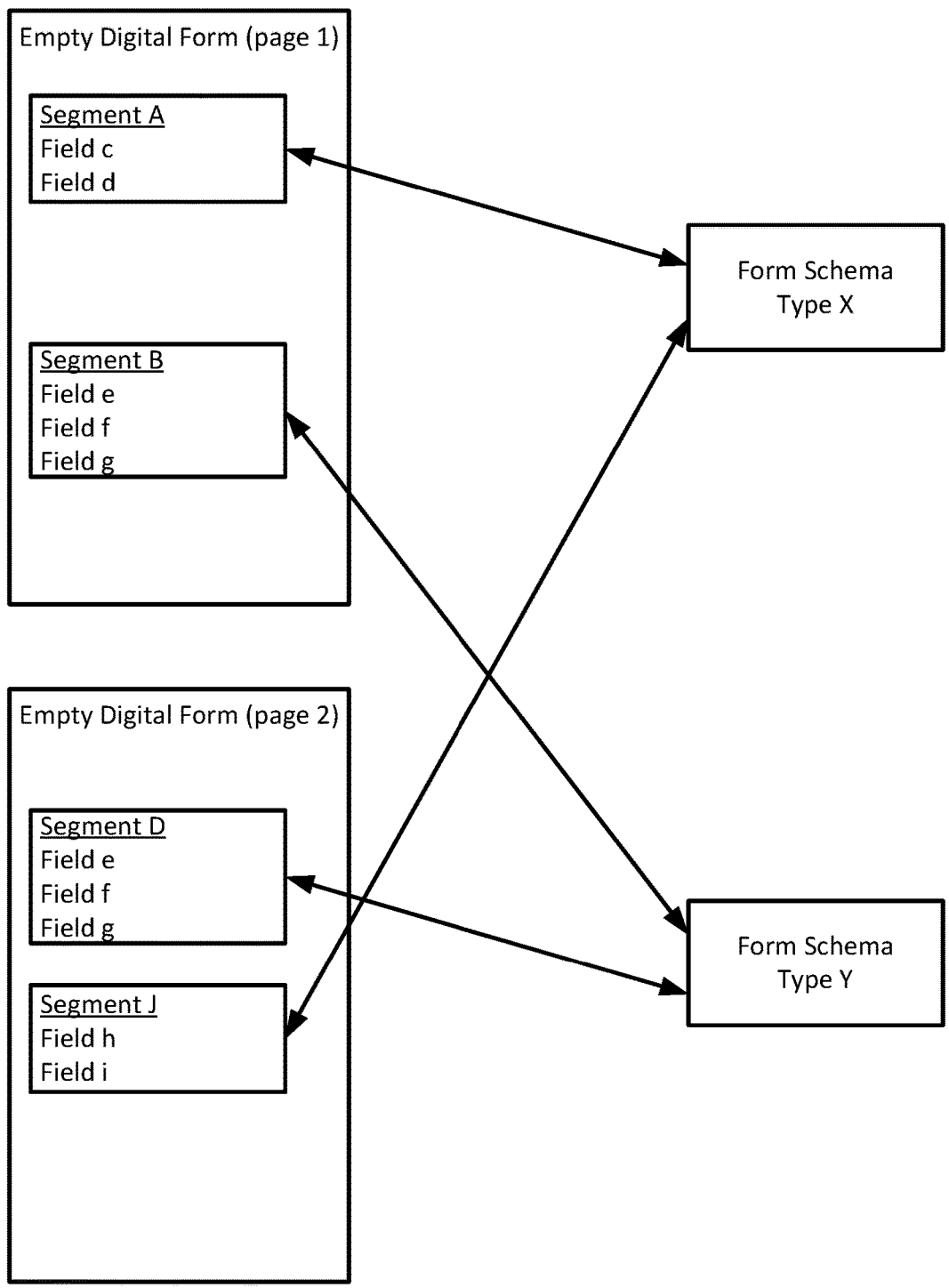
FIG. 2 illustrates example mappings of segments in an empty digital form to respective form schema type elements, in accordance with at least some embodiments described herein.

Schema mapping engine 102 is configured to identify schema mapped segments in an empty digital form. In some embodiments, schema mapping engine 102 is trained over a corpus of form schema type elements (e.g., XML schema type elements) using standard natural language processing techniques. The corpus of form schema type elements may be generated by crawling the Web (e.g., Internet), and maintained in a form schema repository 112. Schema mapping engine 102 can then be trained over the corpus of form schema type elements to identify the schema mapped segments in an empty digital form (the segments that map to the form schema type elements). In some embodiments, schema mapping engine 102 can identify the schema mapped segments that map to the same form schema type as a group of possibly repeating segments. Depending on the particular empty digital form, schema mapping engine 102 can identify one or more schema mapped segments in the empty digital form. Taking the illustrated empty digital form in FIG. 2 as an example, Segment A on page 1, which includes Fields c and d, and Segment J on page 2, which includes Fields h and i, both map to a form schema type X. Segment B on page 1, which includes Fields e, f, and g, and Segment D on page 2, which also includes Fields e, f, and g, both map to a form schema type Y. Accordingly, schema mapping engine 102 identifies Segment A, Segment B, Segment D, and Segment J as schema mapped segments in the empty digital form. In some embodiments, schema mapping engine 102 may also identify Segment A and Segment J as one group of possibly repeating segments (possibly repeating schema mapped segments that map to a first form schema type), and Segment B and Segment D as another group of possibly repeating segments (possibly repeating schema mapped segments that map to a second form schema type).

Repeatability detection engine 104 is configured to parse an empty digital form and identify groups of repeating segments in the empty digital form. Depending on the particular empty digital form, repeatability detection engine 104 can identify one or more groups of repeating segments in the empty digital form. Moreover, the number of repeating segments in the various groups of repeating segments may vary from group to group. For example, repeatability detection engine 104 can parse an empty digital form to identify the segments included in the empty digital form, and compare the identified segments to each other to identify the groups of repeating segments. In some embodiments, repeatability detection engine 104 is configured to identify maximal repeating segments from the identified groups of repeating segments.

Merge and filter engine 106 is configured to merge the outputs from schema mapping engine 102 and repeatability detection engine 104, remove duplicates, and generate a collection of one or more groups of potentially linkable segments in an empty digital form. The potentially linkable segments in each group of potentially linkable segments may be grouped together to signify association to the group (e.g., association to a group may be indicated using a multimap of unique identifiers to the corresponding segments in the group of potentially linkable segments). In some embodiments, merge and filter engine 106 is configured to determine, for each potentially linkable segment that is a maximal segment, whether the potentially linkable maximal segment includes a schema mapped segment. If a potentially linkable maximal segment includes a schema mapped segment, merge and filter engine 106 separates (e.g., breaks out) the schema mapped segment from the potentially linkable maximal segment, thus generating multiple groups of potentially linkable segments.

Link type deduction engine 108 is configured to determine a type of link, if any, to create for the potentially linkable segments in each group of potentially linkable segments in an empty digital form. For each group of potentially linkable segments, link type deduction engine 108 can start with a child segment in the group of potentially linkable segments, and determine a type of link, if any, to create for the child segment. The link created for the child segment may or may not be to its parent segment. In some embodiments, link type deduction engine 108 is configured to determine a type of link, if any, to create for a child segment in a group of potentially linkable segments based on a similarity metric of the child segment to its parent segment. The similarity metric is determined from a comparison of the contents of the child segment and the contents of the parent segment in a corpus of existing completed forms of the same type as the empty digital form. The corpus of existing completed forms may be maintained in a form data repository 114. For example, the similarity may be expressed as $$\text{similarity} = [\Sigma_{i=1:N} I(\text{value(child segment)} == \text{value(parent segment)})]/N \qquad [1]$$

where I( ) is the identity function, value( ) is the contents of the segment, and N is the number of completed forms of the same type as the empty digital form. A similarity value of 1 implies that, over the corpus of consumer filled data in the completed forms of the same type as the empty digital form, the contents of the child segment are the same as the contents of the parent segment. As a result, the child segment is a redundant segment that is not necessary to the meaning or function of the digital form. That is, the child segment need not be completed by a consumer during the form filling experience. In this instance, link type deduction engine 108 can determine (conclude) that a hard link to the parent segment can be created for the child segment. In contrast, a similarity value not equal to 1 but satisfying a similarity threshold (similarity threshold value) implies that, over the corpus of user filled data in the completed forms of the same type as the empty digital form, the contents of the child segment are the same as the contents of the parent segment for at least the similarity threshold of the corpus of completed forms. Depending on the value set for the similarity threshold (e.g., the similarity threshold is set to a sufficiently large value), the contents of the child segment are the same as the contents of the parent segment for a majority or sufficient number of the corpus of completed forms. As a result, the child segment may be a redundant segment in the empty digital form given the parent segment. In the instance where the similarity value is not equal to 1 but satisfies the similarity threshold, link type deduction engine 108 can determine that a soft link to the parent segment can be created for the child segment. In some embodiments, the similarity threshold may be configured, for example, by a system administrator, a form author, or other entity having privileges to configure the similarity threshold. For example, suppose the similarity threshold is set to 80%. Also suppose that, in the corpus of consumer filled data in the completed forms, the contents of the child segment are the same as the contents of the parent segment 90% of the time. In this case, since 90% satisfies the similarity threshold of 80%, link type deduction engine 108 can determine that a soft link to the parent segment can be created for the child segment. In the instance where the similarity value does not satisfy the similarity threshold, link type deduction engine 108 can determine that a link to the parent segment should not be created for the child segment. For example, suppose in the example above that, in the corpus of user filled data in the completed forms, the contents of the child segment are the same as the contents of the parent segment 70% of the time. In this case, since 70% does not satisfy the similarity threshold of 80%, link type deduction engine 108 can determine that a link to the parent segment should not be created for the child segment. In some embodiments, link type deduction engine 108 can identify a parent segment (e.g., parent segment, grandparent segment, etc.) that has the highest similarity metric to the child segment. Link type deduction engine 108 can then determine a type of link, if any, to create between the child segment and the identified parent segment (the parent segment having the highest similarity with the child segment) as described herein.

In the instance where link type deduction engine 108 determines that a link should not be created for a child segment to any of its parent segments, in some embodiments, link type deduction engine 108 is configured to determine whether a prefill link can be created for the child segment. Link type deduction engine 108 can determine whether to create a prefill link for the child segment based on a variability metric, which is a measure of the variability of the contents of child segment across the corpus of existing completed forms of the same type as the empty digital form. For example, the variability may be expressed as $$\text{variability} = 1 - [\text{Mode}(\text{value}(\text{segment}))/N] \qquad [2]$$

where value( ) is the contents of the segment and N is the number of completed forms of the same type as the empty digital form. Variability of a segment is a measure of how static the contents of the segment remain across the corpus of existing completed forms. A low variability implies that, over the corpus of user filled data in the completed forms of the same type as the empty digital form, the segment takes the same value for a large number of the completed forms. In some embodiments, link type deduction engine 108 can determine that a prefill link can be created for a child segment if the variability metric satisfies a variability threshold. Similar to the similarity threshold, the variability threshold may be configured, for example, by a system administrator, a form author, or other entity having privileges to configure the variability threshold. For example, suppose the variability threshold is set to 90%. Also suppose that, in the corpus of user filled data in the completed forms, the contents of the child segment are the same 95% of the time. In this case, since 95% satisfies the variability threshold of 90%, link type deduction engine 108 can determine that a prefill link can be created for the child segment. For example, link type deduction engine 108 can determine that the child segment can be prefilled with default data (e.g., the same contents as in the segments in the 95% of the completed forms). Suppose instead in the example above that, in the corpus of consumer filled data in the completed forms, the contents of the child segment are the same 85% of the time. In this case, since 85% does not satisfy the variability threshold of 90%, link type deduction engine 108 can determine that a prefill link should not be created for the child segment.

In some embodiments, link type deduction engine 108 is configured to determine whether a prefill link can be created for a potentially linkable segment that does not have a parent segment. A potentially linkable segment that does not have a parent segment may be a top level segment in a group of potentially linkable segment (e.g., first segment in the group will not have a predecessor (parent) segment). Additionally or alternatively, a potentially linkable segment that does not have a parent segment may be a standalone segment that maps to a form schema type (e.g., a schematically mapped segment).

Data source mapping engine 110 is configured to determine whether a potentially linkable segment can be mapped (e.g., linked) to a data source. Schema mapped segments in an empty digital form are candidates to be mapped to a data source. For example, a form author may have specified a data source from which to obtain the data to provide in a segment, such as a schema mapped segment, in an empty digital form. In the instance where a data source is specified for the potentially linkable segment, data source mapping engine 110 can determine that a data source link to the specified data source can be created for the potentially linkable segment.

Figure 3:
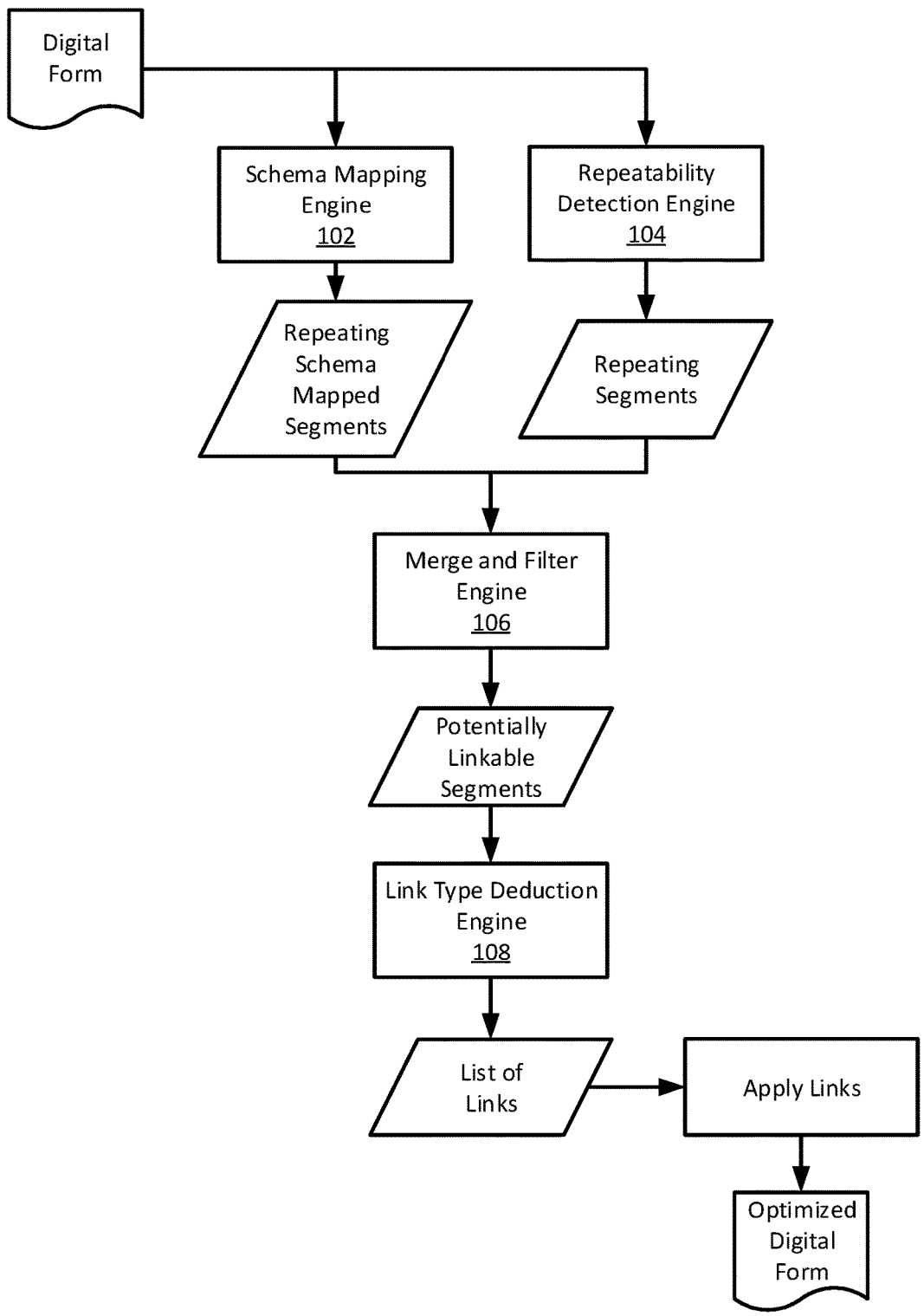
FIG. 3 illustrates example interactions between selected components of the example digital form optimization system to optimize an empty digital form, in accordance with at least some embodiments described herein.

FIG. 3 illustrates example interactions between selected components of example digital form optimization system 100 to optimize an empty digital form, in accordance with at least some embodiments described herein. As described earlier, it may be desirable to optimize an empty digital form to reduce the number of segments in the digital form that a consumer of the empty digital form needs to complete. This may be accomplished by identifying and linking redundant segments in the empty digital form.

As depicted, an empty digital form is provided to schema mapping engine 102 for processing. Schema mapping engine 102 processes the empty digital form to identify schema mapped segments in the empty digital form. For example, the various segments of the empty digital form are compared to the existing form schema types to identify the schema mapped segments in the empty digital form. In some embodiments, schema mapped segments that map to the same form schema type in the empty digital form may be identified as being possibly repeating in the empty digital form. The empty digital form is also provided to repeatability detection engine 104 for processing. Repeatability detection engine 104 processes the empty digital form to identify groups of repeating segments in the empty digital form. In some embodiments, maximal repeating segments in the empty digital form are identified as being the possibly repeating segments in the empty digital form.

The outputs from schema mapping engine 102 (the schema mapped segments) and repeatability detection engine 104 (the groups of repeating segments) are provided to merge and filter engine 106 for processing. Merge and filter engine 106 merges and filters the outputs from schema mapping engine 102 and repeatability detection engine 104 to generate a collection of one or more groups of potentially linkable segments in the empty digital form. For the potentially linkable maximal segments that include a schema mapped segment, in some embodiments, merge and filter engine 106 separates the schema mapped segment from the potentially linkable maximal segment, thus making each of the separated segments, including the schema mapped segment, a group of potentially linkable segments. The output from merge and filter engine 106 is provided to link type deduction engine 108 for processing. Link type deduction engine 108 processes each group of potentially linkable segments and determines a type of link, if any, to create for each potentially linkable segment in the group of potentially linkable segments. Determination of the type of link to create for a potentially linkable segment is further discussed below in conjunction with FIGS. 4A and 4B. Link type deduction engine 108 may generate a list of links that can be created for the potentially linkable segments. Determination that a link can be created for a potentially linkable segment may be an indication that the potentially linkable segment is a redundant segment in the empty digital form. In some embodiments, the links that can be created for the potentially linkable segments in the empty digital form are recommended to a form author for creation in the empty digital form. Digital form optimization system 100 may provide a user interface, such as a graphical user interface (GUI) or other suitable authoring tool, to recommend the creation of the links that can be created for the redundant segments in the empty digital form. For example, each redundant segment in the empty digital form may appear highlighted or otherwise distinguished (e.g., different levels of transparency) from the other contents in the empty digital form. The recommendation associated with the redundant segment (e.g., an explanation of the type of link that can be created) may also be provided, for example, in a pop-up text box or other suitable display window. A control element, such as a button or other suitable selection mechanism, to accept (or decline) the recommended creation of a link for the redundant segment may be provided in the vicinity of the redundant segment in the empty digital form. A form author may then use the control element to accept or decline the recommended creation of the links for the redundant segments in the empty digital form. The recommended links (recommended creation of links that can be created for the redundant segments) that are accepted by the form author are applied to the redundant segments to generate an optimized empty digital form.

In some embodiments, the appearance of the redundant segments (segments having a link) in an empty digital form is configurable, for example, by a form author. For example, the form author may configure the redundant segments (segments having a link) in an empty digital form to still remain in the empty digital form, but be displayed or appear in the digital form as segments that are not fillable. That is, the redundant segments may be included as non-fillable segments in the digital form. For example, at the time of use by a consumer, a segment in an empty digital form having a soft link to another segment in the digital form may appear as a non-fillable segment. When the consumer completes the other segment to which the segment is linked, the segment is automatically completed with the contents from the consumer-completed segment. Once a redundant segment is completed, the contents of the redundant segment may be edited (changed) by the consumer. In some embodiments, a mechanism may be provided in the digital form to allow a consumer to "de-activate" the link, thus making the redundant segment fillable by the consumer. For example, the consumer may de-activate the link by clicking on the redundant section using a mouse, or other suitable pointing device.

Figure 4A:
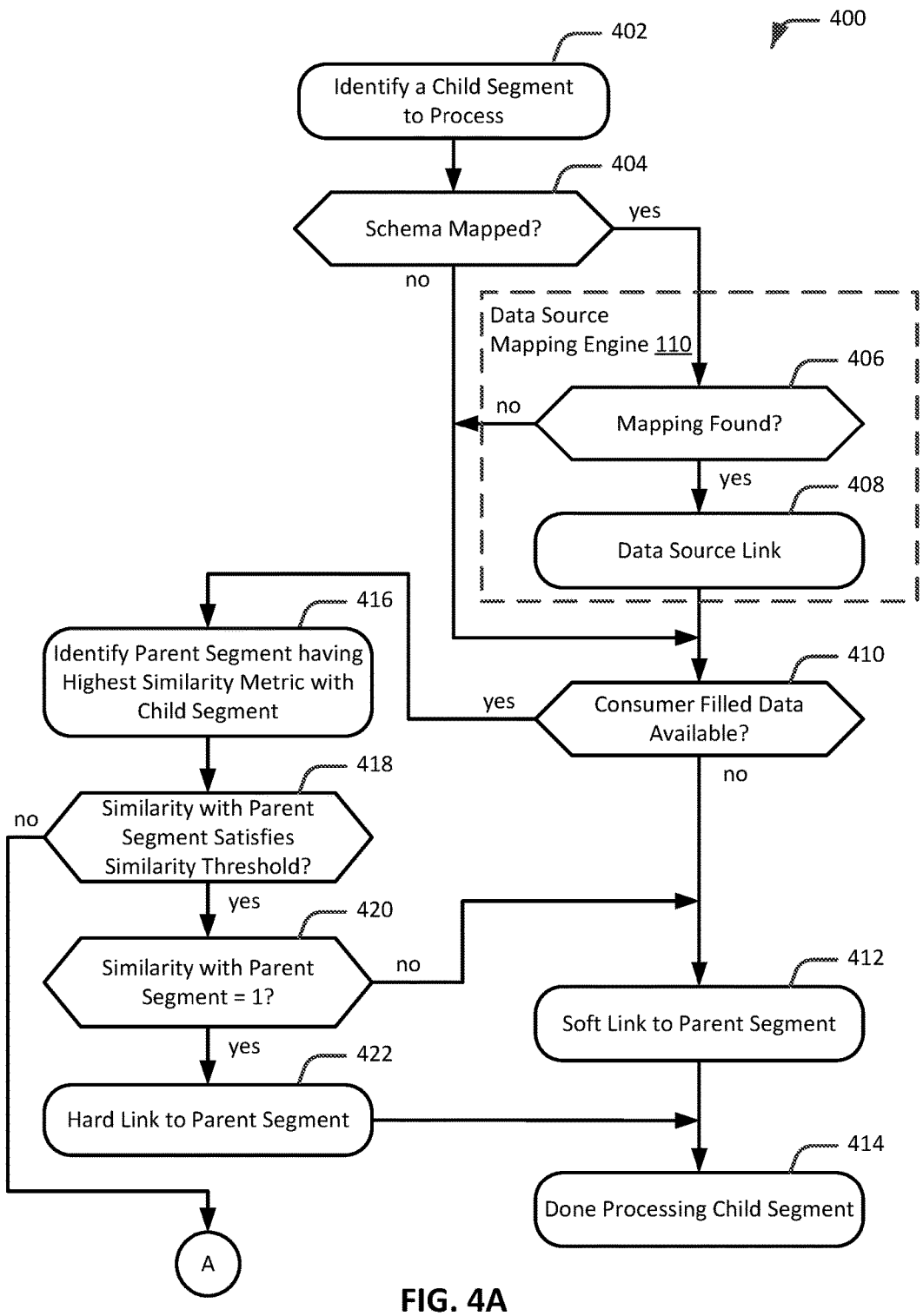
FIGS. 4A and 4B are a flow diagram that illustrates an example process to determine link types, in accordance with at least some embodiments described herein.
Figure 4B:
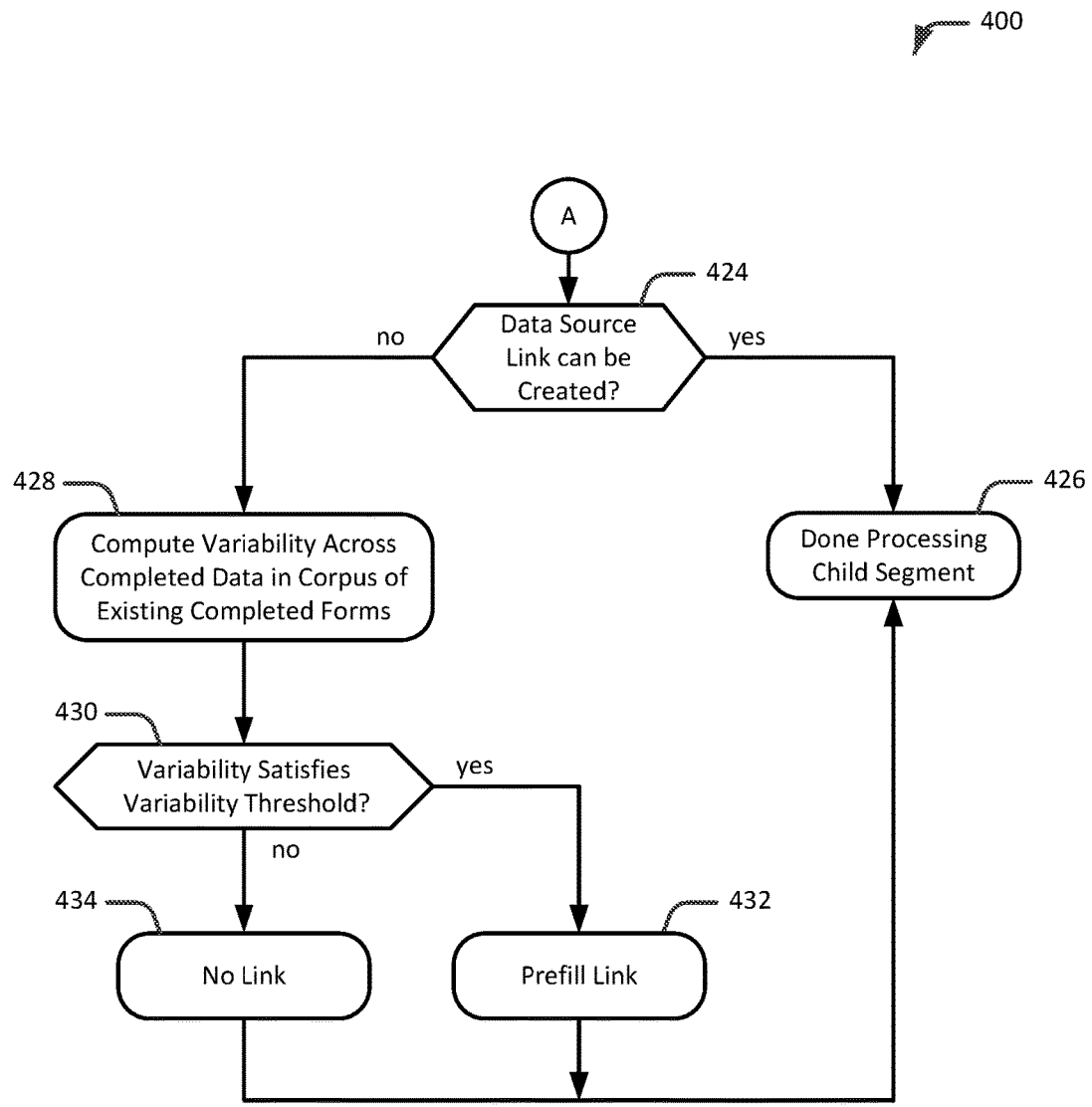

FIGS. 4A and 4B is a flow diagram 400 that illustrates an example process to determine link types, in accordance with at least some embodiments described herein. Example processes and methods may include one or more operations, functions or actions as illustrated by one or more of blocks 402, 404, 406, 408, 410, 412, 414, 416, 418, 420, 422, 424, 426, 428, 430, 432, and/or 434, and may in some embodiments be performed by a computing system such as a computing system 500 of FIG. 5. The operations described in blocks 402-434 may also be stored as computer-executable instructions in a computer-readable medium, such as a memory 504 and/or a data storage 506 of computing system 500. The process may be performed by digital form optimization system 100.

As depicted by flow diagram 400, the process may begin with block 402, where link type deduction engine 108 identifies a child segment to process. Link type deduction engine 108 may be processing one or more groups of potentially linkable segments in an empty digital form to determine a type of link, if any, to create for the potentially linkable segments in each group of potentially linkable segments. In processing each group of potentially linkable segments, link type deduction engine 108 can start with a child segment in a group that does not have a child (successor). Starting with this child segment, link type deduction engine 108 can determine whether a link can be created for the child segment. Once this determination is made, link type deduction engine 108 can process the next child segment that does not have a child that is yet to be processed (the parent segment of the child segment just processed), until all the segments in the group of potentially linkable segments are processed. Having completed the processing of one group of potentially linkable segments in this manner, link type deduction engine 108 can process another group of potentially linkable segments, until all groups of potentially linkable segments in the empty digital form are processed.

Block 402 may be followed by decision block 404, where link type deduction engine 108 determines whether the child segment is mapped to a schema (e.g., form schema type). For example, the child segment may be a segment identified by schema mapping engine 102 as mapping to a known form schema type element. If link type deduction engine 108 determines that the child segment is mapped to a schema, decision block 404 may be followed by decision block 406, where link type deduction engine 108 provides or otherwise makes available the child segment to data source mapping engine 110 for processing. At decision block 406, data source mapping engine 110 determines whether the child segment is mapped to a data source. Data source mapping engine 110 determines whether the child segment can be completed with data from a data source. For example, a form author may have specified a data source from which to obtain the data to complete the child segment. If data source mapping engine 110 determines that the child segment is mapped to a data source, decision block 406 may be followed by block 408, where data source mapping engine 110 determines that a data source link to the data source can be created for the child segment. Block 408 may be followed by decision block 410, where link type deduction engine 108 continues to process the child segment. In this instance, although a data source link can be created for the child segment, the child segment is further processed to determine whether a link (a hard link or a soft link) to the parent segment can be created for the child segment.

Otherwise, if, at decision block 406, data source mapping engine 110 determines that the child segment is not mapped to a data source, decision block 406 may be followed by decision block 410, where link type deduction engine 108 determines whether a corpus of completed forms of the same type as the empty digital form, which may be used to determine the type of link to create for the child segment, is available. Link type deduction engine 108 can determine whether to create a hard link, a soft link, or a prefill link for the child segment based on the corpus of completed forms of the same type as the empty digital form. If link type deduction engine 108 determines that a corpus of completed forms is not available, decision block 410 may be followed by block 412, where link type deduction engine 108 determines that a soft link to the parent segment can be created for the child segment. A soft link is created for a child segment in the absence of a corpus of completed forms of the same type as the empty digital form, given that the child segment and its parent segment were determined to be potentially linkable in the empty digital form. Block 412 may be followed by block 414, where link type deduction engine 108, having determined that a soft link can be created for the child segment, is done processing the child segment. Link type deduction engine 108 can continue processing by identifying the next child segment to process in the current group of linkable segments, or identify another group of linkable segments to process in the empty digital form.

Otherwise, if, at decision block 410, link type deduction engine 108 determines that a corpus of completed forms of the same type as the empty digital form is available, decision block 410 may be followed by block 416, where link type deduction engine 108 identifies a parent segment (e.g., a parent, grandparent, etc., of the child segment) having the highest similarity metric with the child segment. The similarity metric is determined from a comparison of the contents of the child segment and the contents of the parent segment in a corpus of existing completed forms of the same type as the empty digital form. Accordingly, the identified parent segment is a parent segment from all parent segments of the child segment that has the highest similarity with the child segment.

Block 416 may be followed by decision block 418, where link type deduction engine 418 determines whether a similarity metric of the contents of the child segment and the contents of the identified parent segment (the parent segment having the highest similarity metric with the child segment) in the corpus of completed forms of the same type as the empty digital form satisfies a similarity threshold. The similarity threshold indicates a level of confidence with which link type deduction engine 108 can conclude that the child segment is redundant given the identified parent segment. If link type deduction engine 108 determines that the similarity metric of the contents of the child segment and the contents of the identified parent segment in the corpus of completed forms satisfies the similarity threshold, decision block 418 may be followed by decision block 420, where link type deduction engine 108 determines whether the similarity metric is 1. A similarity metric of 1 implies that the contents of the child segment and the contents of the identified parent segment in the corpus of completed forms of the same type as the empty digital form are the same.

If link type deduction engine 108 determines that the similarity metric is not 1, decision block 420 may be followed by block 412, where link type deduction engine 108 determines that a soft link to the identified parent segment can be created for the child segment. Link type deduction engine 108 can then continue processing at block 414 as described above. Otherwise, if link type deduction engine 108 determines that the similarity metric is 1, decision block 420 may be followed by block 422, where link type deduction engine 108 determines that a hard link to the identified parent segment can be created for the child segment. Link type deduction engine 108 determines that a hard link to the identified parent segment can be created for the child segments since the contents of the child segment is always the same as the contents of the identified parent segment in the corpus of completed forms. Link type deduction engine 108 can then continue processing at block 414 as described above.

Otherwise, if, at decision block 418, link type deduction engine 108 determines that the similarity metric of the contents of the child segment and the contents of the identified parent segment in the corpus of completed forms does not satisfy the similarity threshold, decision block 418 may be followed by decision block 424. In this instance, link type deduction engine 108 determines that a soft link or a hard link is not to be created for the child segment as a result of the similarity metric (e.g., the highest similarity metric) not satisfying the similarity threshold.

At decision block 424, link type deduction engine 108 determines whether data source mapping engine 110 previously determined that a data source link can be created for the child segment. At this stage in the processing, link type deduction engine 108 has determined that, based on the corpus of completed forms of the same type as the empty digital form, a link is not to be created between the child segment and any of the parent segments. That is, link type deduction engine 108 has concluded that the child segment is not a redundant segment based on the potentially linkable segments in the group of potentially linkable segments to which the child segment is a member. Having concluded that a hard link or a soft link is not to be created for the child segment, link type deduction engine 108 is processing the child segment to determine whether a prefill link can be created for the child segment. If link type deduction engine 108 determines that a data source link can be created for the child segment, decision block 424 may be followed by block 426, where link type deduction engine 108 is done processing the child segment. In this instance, as a data source link can be created for the child segment, the child segment is not further processed to determine whether the data source link should be changed to a prefill link, or whether the data source link should not be created for the child segment, based on the corpus of completed forms. Link type deduction engine 108 can continue processing by identifying the next child segment to process in the current group of linkable segments, or identify another group of linkable segments to process in the empty digital form.

Otherwise, if, at decision block 424, link type deduction engine 108 determines that a data source link cannot be (e.g., is not to be) created for the child segment, decision block 424 may be followed by block 428, where link type deduction engine 108 computes a variability metric which is a measure of the variability of the contents of child segment across the corpus of completed forms of the same type as the empty digital form.

Block 428 may be followed by decision block 430, where link type deduction engine 108 determines whether the variability metric satisfies a variability threshold. The variability threshold indicates a level of confidence with which link type deduction engine 108 can conclude that the child segment can be prefilled with default data based on the contents of the child segment in the corpus of completed forms of the same type as the empty digital form, thus making the child segment a redundant segment in the empty digital form. If link type deduction engine 108 determines that the variability metric satisfies the variability threshold, decision block 430 may be followed by block 432, where link type deduction engine 108 determines that a prefill link can be created for the child segment. In this instance, link type deduction engine 108 can determine that the child segment can be prefilled with default data, for example, the same contents as in the majority of the child segments in the corpus of completed forms. Block 432 may be followed by block 426, where link type deduction engine 108 is done processing the child segment. Link type deduction engine 108 can continue processing by identifying the next child segment to process in the current group of linkable segments, or identify another group of linkable segments to process in the empty digital form.

Otherwise, if, at decision block 430, link type deduction engine 108 determines that a prefill link cannot be (e.g., is not to be) created for the child segment, decision block 430 may be followed by block 434, where link type deduction engine 108 determines that a link should not be created for the child segment. In this instance, as no link is to be created for the child segment, the child segment is not a redundant segment in the empty digital form, even though the child segment is included in the group of potentially linkable segments. Link type deduction engine 108 can then continue processing at block 426 as described above.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Figure 5:
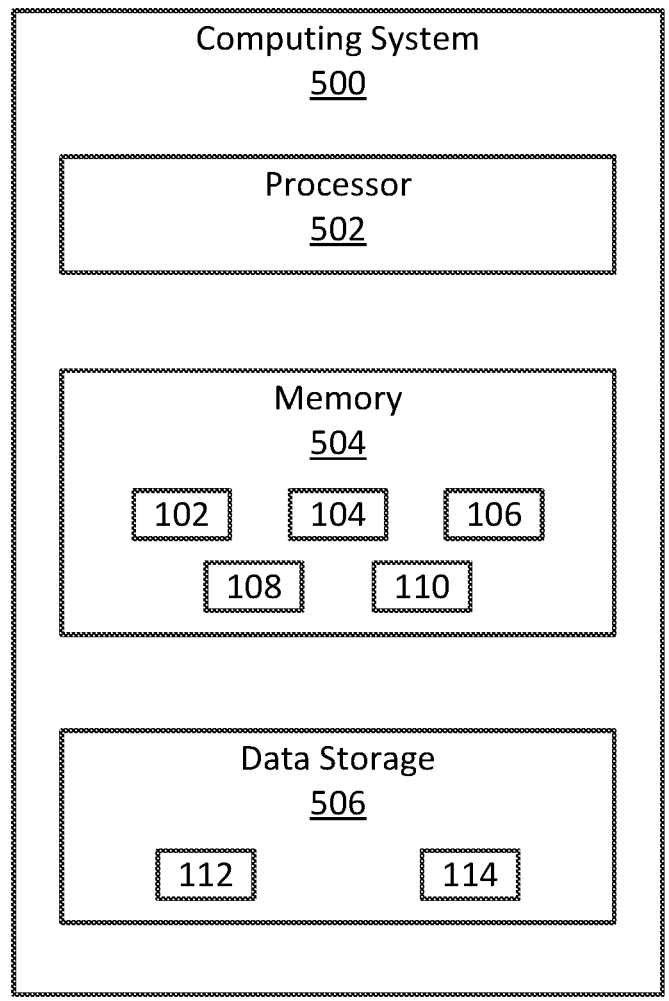
FIG. 5 illustrates selected components of an example computing system that may be used to perform any of the techniques as variously described in the present disclosure, in accordance with at least some embodiments described herein.

FIG. 5 illustrates selected components of example computing system 500 that may be used to perform any of the techniques as variously described in the present disclosure, in accordance with at least some embodiments described herein. In some embodiments, computing system 500 may be configured to implement or direct one or more operations associated with some or all of the engines, components and/or modules associated with digital form optimization system 100 of FIG. 1. For example, schema mapping engine 102, repeatability detection engine 104, merge and filter engine 106, link type deduction engine 108, data source mapping engine 110, or any combination of these may be implemented in and/or using computing system 500. In one example case, for instance, each of engines 102, 104, 106, 108, and 110 is loaded in memory 504 and executable by a processor 502, and form schema repository 112 and form data repository 114 are included in data storage 506. Computing system 500 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 500 may include processor 502, memory 504, and data storage 506. Processor 502, memory 504, and data storage 506 may be communicatively coupled.

In general, processor 502 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 5, processor 502 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 502 may be configured to interpret and/or execute program instructions and/or process data stored in memory 504, data storage 506, or memory 504 and data storage 506. In some embodiments, processor 502 may fetch program instructions from data storage 506 and load the program instructions in memory 504. After the program instructions are loaded into memory 504, processor 502 may execute the program instructions.

For example, in some embodiments, any one or more of the engines, components and/or modules of digital form optimization system 100 may be included in data storage 506 as program instructions. Processor 502 may fetch some or all of the program instructions from data storage 506 and may load the fetched program instructions in memory 504. Subsequent to loading the program instructions into memory 504, processor 502 may execute the program instructions such that the computing system may implement the operations as directed by the instructions.

In some embodiments, virtualization may be employed in computing device 500 so that infrastructure and resources in computing device 500 may be shared dynamically. For example, a virtual machine may be provided to handle a process running on multiple processors so that the process appears to be using only one computing resource rather than multiple computing resources. Multiple virtual machines may also be used with one processor.

Memory 504 and data storage 506 may include computer-readable storage media for carrying or having computer-executable instructions or data structures stored thereon. Such computer-readable storage media may include any available media that may be accessed by a general-purpose or special-purpose computer, such as processor 502. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 502 to perform a certain operation or group of operations.

Modifications, additions, or omissions may be made to computing system 500 without departing from the scope of the present disclosure. For example, in some embodiments, computing system 500 may include any number of other components that may not be explicitly illustrated or described herein.

As indicated above, the embodiments described in the present disclosure may include the use of a special purpose or a general purpose computer (e.g., processor 502 of FIG. 5) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 504 of FIG. 5) for carrying or having computer-executable instructions or data structures stored thereon.

Numerous example variations and configurations will be apparent in light of this disclosure. According to some examples, systems to automatically link redundant segments in an empty digital form are described. An example system may include: one or more non-transitory machine readable mediums configured to store instructions; and one or more processors configured to execute the instructions stored on the one or more non-transitory machine readable mediums. Execution of the instructions by the one or more processors may cause the one or more processors to: determine multiple potentially linkable segments in an empty digital form, the multiple potentially linkable segments including a child segment and a parent segment; determine a type of link to create for the child segment; provide a recommendation to create the determined type of link for the child segment; and responsive to a determination of an acceptance of the recommendation, create the determined type of link for the child segment.

In some examples of the system, the type of link is a hard link to the parent segment. In other examples of the system, the type of link is a soft link to the parent segment. In still other examples of the system, the type of link is a data source link to a data source. In yet other examples of the system, the type of link is a prefill link. In further examples of the system, to determine the type of link comprises determine a similarity metric between contents of the child segment and contents of the parent segment in a corpus of existing completed forms of a same type as the empty digital form. In still further examples of the system, to determine the type of link comprises determine a variability metric across contents of the child segment in a corpus of existing completed forms of a same type as the empty digital form. In yet further examples of the system, the child segment and the parent segment map to a form schema type. In other examples of the system, the child segment and the parent segment are maximal repeating segments in the empty digital form.

According to some examples, computer-implemented methods to automatically link redundant segments in an empty digital form are described. An example computer-implemented method may include: determining multiple potentially linkable segments in an empty digital form, the multiple potentially linkable segments including a child segment and a parent segment; determining a type of link to create for the child segment; providing a recommendation to create the determined type of link for the child segment; and responsive to a determination of an acceptance of the recommendation, creating the determined type of link for the child segment.

In some examples of the method, the type of link is a hard link to the parent segment. In other examples of the method, the type of link is a soft link to the parent segment. In still other examples of the method, the type of link is a data source link to a data source. In yet other examples of the method, the type of link is a prefill link. In further examples of the method, determining the type of link comprises determining a similarity metric between contents of the child segment and contents of the parent segment in a corpus of existing completed forms of a same type as the empty digital form. In still further examples of the method, determining the type of link comprises determining a variability metric across contents of the child segment in a corpus of existing completed forms of a same type as the empty digital form. In yet further examples of the method, the child segment and the parent segment map to a form schema type. In other examples of the method, the child segment and the parent segment are maximal repeating segments in the empty digital form.

According to some examples, computer program products including one or more non-transitory machine readable mediums encoded with instructions that when executed by one or more processors cause a process to be carried out to automatically link redundant segments in an empty digital form are described. An example process may include: determining multiple potentially linkable segments in an empty digital form, the multiple potentially linkable segments including a child segment and a parent segment; determining a type of link to create for the child segment; providing a recommendation to create the determined type of link for the child segment; and responsive to a determination of an acceptance of the recommendation, creating the determined type of link for the child segment.

In some examples of the process, the type of link is a hard link to the parent segment. In other examples of the process, the type of link is a soft link to the parent segment. In still other examples of the process, the type of link is a data source link to a data source. In yet other examples of the process, the type of link is a prefill link. In further examples of the process, determining the type of link comprises determining a similarity metric between contents of the child segment and contents of the parent segment in a corpus of existing completed forms of a same type as the empty digital form. In still further examples of the process, determining the type of link comprises determining a variability metric across contents of the child segment in a corpus of existing completed forms of a same type as the empty digital form. In yet further examples of the process, the child segment and the parent segment map to a form schema type. In other examples of the process, the child segment and the parent segment are maximal repeating segments in the empty digital form.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system comprising:
one or more non-transitory machine readable mediums configured to store instructions; and
one or more processors configured to execute the instructions stored on the one or more non-transitory machine readable mediums, wherein execution of the instructions causes the one or more processors to implement a process for automatically linking redundant form segments, the process comprising:
receiving an empty digital form comprising segments that include a plurality of form fields,
identifying a first group of segments of the form fields, wherein the first group of segments semantically maps to a form schema,
identifying a second group of segments of the form fields, wherein the second group of segments repeats within the empty digital form,
merging the first and second groups of segments, thereby producing a group of potentially linkable segments,
filtering the group of potentially linkable segments to remove duplicate form fields, thereby producing a filtered group of potentially linkable segments representable as an ordered set of segments, the filtered group of potentially linkable segments including a child segment and a parent segment that occurs before the child segment in the ordered set of segments,
determining a type of link to create for the child segment by determining a similarity metric between contents of the child segment and contents of the parent segment in a corpus of existing completed forms of a same type as the empty digital form,
providing a recommendation to create the determined type of link for the child segment, and
creating the determined type of link for the child segment.

2. The system of claim 1, wherein the type of link is a hard link between the parent segment and the child segment.

3. The system of claim 1, wherein the type of link is a soft link between the parent segment and the child segment.

4. The system of claim 1, wherein the type of link is a data source link to a data source.

5. The system of claim 1, wherein the type of link is a prefill link.

6. The system of claim 1, wherein determining the type of link further comprises determining a variability metric across contents of the child segment in the corpus of existing completed forms.

7. The system of claim 1, wherein the child segment and the parent segment both map to the form schema.

8. The system of claim 1, wherein the child segment and the parent segment are maximal repeating segments in the empty digital form.

9. A computer-implemented method to automatically link redundant segments in an empty digital form, the method comprising:
receiving an empty digital form comprising segments that include a plurality of form fields;
identifying a first group of segments of the form fields, wherein the first group of segments semantically maps to a form schema;
identifying a second group of segments of the form fields, wherein the second group of segments repeats within the empty digital form;
merging the first and second groups of segments, thereby producing a group of potentially linkable segments;
filtering the group of potentially linkable segments to remove duplicate form fields, thereby producing a filtered group of potentially linkable segments representable as an ordered set of segments, the filtered group of potentially linkable segments including a child segment and a parent segment that occurs before the child segment in the ordered set of segments;
determining a type of link to create for the child segment by determining a similarity metric between contents of the child segment and contents of the parent segment in a corpus of existing completed forms of a same type as the empty digital form;
providing a recommendation to create the determined type of link for the child segment; and
creating the determined type of link for the child segment.

10. The method of claim 9, wherein the type of link is one of a hard link between the parent and child segments; a soft link between the parent and child segments; a data source link to a data source; and a prefill link.

11. The method of claim 9, wherein determining the type of link further comprises determining a variability metric across contents of the child segment in the corpus of existing completed forms.

12. The method of claim 9, wherein the child segment and the parent segment both map to the form schema.

13. The method of claim 9, wherein the child segment and the parent segment are maximal repeating segments in the empty digital form.

14. A computer program product including one or more non-transitory machine readable mediums encoded with instructions that when executed by one or more processors cause a process to be carried out to automatically link redundant segments in an empty digital form, the process comprising:
receiving an empty digital form comprising segments that include a plurality of form fields;

identifying a first group of segments of the form fields, wherein the first group of segments semantically maps to a form schema;

identifying a second group of segments of the form fields, wherein the second group of segments repeats within the empty digital form;

merging the first and second groups of segments, thereby producing a group of potentially linkable segments;

filtering the group of potentially linkable segments to remove duplicate form fields, thereby producing a filtered group of potentially linkable segments representable as an ordered set of segments, the filtered group of potentially linkable segments including a child segment and a parent segment that occurs before the child segment in the ordered set of segments;

determining a type of link to create for the child segment by determining a similarity metric between contents of the child segment and contents of the parent segment in a corpus of existing completed forms of a same type as the empty digital form;

providing a recommendation to create the determined type of link for the child segment; and creating the determined type of link for the child segment.

15. The computer program product of claim 14, wherein the type of link is one of a hard link between the parent and child segments; a soft link between the parent and child segments; a data source link to a data source; and a prefill link.

16. The computer program product of claim 14, wherein the child segment and the parent segment both map to the form schema.

17. The computer program product of claim 14, wherein the child segment and the parent segment are maximal repeating segments in the empty digital form.

* * * * *